(12) United States Patent
Shen et al.

(10) Patent No.: US 10,802,264 B2
(45) Date of Patent: Oct. 13, 2020

(54) ADJUSTABLE DIGITAL MICROSCOPE DISPLAY

(71) Applicant: Bio-Rad Laboratories, Inc., Hercules, CA (US)

(72) Inventors: Zuo Cheng Shen, Martinez, CA (US);
Daniel Y. Chu, Hercules, CA (US);
Nicholas Doe, San Ramon, CA (US);
Emmanuel Quiroz, Benicia, CA (US);
Amber Iraeta, El Cerrito, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 17 days.

(21) Appl. No.: 15/729,503

(22) Filed: Oct. 10, 2017

(65) Prior Publication Data

US 2018/0031819 A1 Feb. 1, 2018

Related U.S. Application Data

(62) Division of application No. 14/267,735, filed on May 1, 2014, now Pat. No. 9,829,696.

(60) Provisional application No. 61/818,251, filed on May 1, 2013, provisional application No. 61/818,332, filed on May 1, 2013, provisional application No. 61/818,258, filed on May 1, 2013, provisional application No. 61/818,340, filed on May 1, 2013.

(51) Int. Cl.
*G02B 21/36* (2006.01)
*G02B 21/24* (2006.01)

(52) U.S. Cl.
CPC ......... *G02B 21/368* (2013.01); *G02B 21/241* (2013.01); *G02B 21/365* (2013.01)

(58) Field of Classification Search
CPC ... G02B 21/368; G02B 21/241; G02B 21/365
See application file for complete search history.

(56) References Cited

U.S. PATENT DOCUMENTS

| 5,071,241 A | 12/1991 | Brock |
| 5,122,648 A | 6/1992 | Cohen et al. |

(Continued)

FOREIGN PATENT DOCUMENTS

| JP | 2008-520975 A | 6/2008 |
| JP | 2010-175774 A | 8/2010 |
| WO | 2006/055521 A2 | 5/2006 |

OTHER PUBLICATIONS

First Japanese Office Action in JP Appln. 2016-512035 dated May 16, 2018; 10 pages.

(Continued)

*Primary Examiner* — Tat C Chio
(74) *Attorney, Agent, or Firm* — Kilpatrick Townsend and Stockton LLP

(57) ABSTRACT

The present invention relates in general to microscopy systems. In particular, the present invention relates to microscopes rendering digital images of samples, with the capability to digitally control the focus of the microscope system, and the software used to control the operation of the digital microscope system. Further, the present invention relates to a microscope structure that allows for compact and multi-functional use of a microscope, providing for light shielding and control with samples that require specific light wavelength characteristics, such as fluorescence, for detection and imaging.

16 Claims, 8 Drawing Sheets

(56) References Cited

U.S. PATENT DOCUMENTS

| | | |
|---|---|---|
| 5,157,251 A | 10/1992 | Albrecht et al. |
| 6,153,426 A | 11/2000 | Heimberg |
| 6,197,572 B1 | 3/2001 | Schneebeli |
| 6,400,395 B1 | 6/2002 | Hoover et al. |
| 6,677,151 B2 | 1/2004 | Sandell |
| 6,711,283 B1 * | 3/2004 | Soenksen ............ G02B 21/002 382/133 |
| RE42,091 E | 1/2011 | Moscovitch et al. |
| 2003/0058530 A1 | 3/2003 | Kawano |
| 2003/0063189 A1 | 4/2003 | Hirunuma et al. |
| 2006/0171024 A1 | 8/2006 | Hoyer |
| 2007/0285769 A1 | 12/2007 | Shirota et al. |
| 2008/0246949 A1 | 10/2008 | Harris et al. |
| 2008/0302926 A1 | 12/2008 | Cheng et al. |
| 2009/0269835 A1 | 10/2009 | Ceremony et al. |
| 2009/0274360 A1 * | 11/2009 | Suzuki ............... G01N 21/6428 382/133 |
| 2011/0052037 A1 | 3/2011 | Coumans et al. |
| 2011/0122242 A1 | 5/2011 | Garud et al. |
| 2011/0157316 A1 | 6/2011 | Okamoto et al. |
| 2011/0261184 A1 | 10/2011 | Mason et al. |
| 2011/0266438 A1 | 11/2011 | Harada et al. |
| 2012/0007977 A1 | 1/2012 | Yamamoto et al. |
| 2012/0304768 A1 | 12/2012 | Sakuma et al. |
| 2012/0304786 A1 | 12/2012 | Wason et al. |
| 2013/0076888 A1 * | 3/2013 | Hibino ................. G02B 21/025 348/79 |
| 2014/0085453 A1 | 3/2014 | Yamane |
| 2014/0327757 A1 | 11/2014 | Shen et al. |
| 2014/0327758 A1 | 11/2014 | Hsiung et al. |
| 2014/0333997 A1 | 11/2014 | Oda |
| 2014/0340475 A1 | 11/2014 | Furuhata |
| 2015/0332473 A1 * | 11/2015 | Cao ......................... H04N 1/387 382/255 |
| 2016/0005337 A1 * | 1/2016 | Traylor ................... G09B 5/02 715/803 |
| 2016/0246041 A1 | 8/2016 | Rappel |

OTHER PUBLICATIONS

Third Chinese Office Action in CN Appln. 201480035391.9 dated Sep. 25, 2018; 18 pages.

Molecular Probes by life technologies User Guide "FLoid Cell Imaging Station" Catalogue No. 4471136, Rev. 2, 2012 (46 pages).

LumaScope 500 Series User's Guide, Rev. 2.0, 2012 (19 pages).

Preview Tour for the new EVOS fl auto microscope, PEQLAD Ltd, News Sep. 17, 2012, (2 pages).

Floid Cell Imaging Station. Life Technologies. Dec. 17, 2011. product manual. [online] (retrieved from the internet) <URL:http://tools.lifetechnologies.com/contenUsfs/manuals/floid_cell_imaging_station_man.pdf>; p. 9, figure 1.

International Search Report sand Written Opinion for PCT Application PCT/US2014/036319, dated Sep. 9, 2012, 11 pages.

LumaScope 400 iVue User's Guide, ETALUMA. Jan. 30, 2012. product manual [online]. (retrieved from the internet) <URL:http:/lwww.etaluma.com/files/resources/downloads/LumaScope_Model_400_UsersGuideRev2_2.pdf>; p. 1, figure 1, p. 3, section 1.1; pp. 5-6, section 2.6.

Anonymous, "Invertoscope ID 03 and ID 03 MT Operating Instructions G 41-127 / i-e", Nov. 11, 2006, retrieved from the internet on Oct. 21, 2016: http://www.science-info.net/docs/zeiss/invertoscopeID03.pdf.

"EVOS fl User Guide", Jul. 17, 2011, retrieved from the internet on Oct. 21, 2016: http://fscimage.fishersci.com/cmsassets/downloads/segment/Scientific/pdf/AMG/fl_user_guide.pdf.

Kahle, et al. "An Inexpensive Simple-to-Use Inverted Fluorescence Microscope: A New Tool for Cellular Analysis", Journal of the Association for Laboratory Automation, Elsevier, vol. 15, No. 5, Oct. 2010, pp. 355-361.

Partial Supplementary European Search Report for European Patent Application No. 14791630.8 dated Nov. 3, 2016, 7 pages.

International Search Report and Written Opinion dated Feb. 4, 2015, from PCT Application No. PCT/US2014/036211 (8 pages).

Extended European Search Report dated Feb. 8, 2017 in EP 14791630.8, 12 pages.

* cited by examiner

ADJUSTABLE DIGITAL MICROSCOPE DISPLAY

CROSS-REFERENCES TO RELATED APPLICATIONS

This application is a divisional of U.S. patent application Ser. No. 14/267,735 filed May 1, 2014, which claims priority to each of U.S. Provisional Patent Application No. 61/818,251, entitled "ADJUSTABLE DIGITAL MICROSCOPE DISPLAY"; U.S. Provisional Patent Application No. 61/818,332, entitled "DIGITAL MICROSCOPE DISPLAY SCREEN APPLICATION"; U.S. Provisional Patent Application No. 61/818,258, entitled "ADJUSTABLE DIGITAL MICROSCOPE FOCUSING CONTROLS"; and U.S. Provisional Patent Application No. 61/818,340, entitled "DIGITAL MICROSCOPE VIEW CAMERA AND DISPLAY", each filed concurrently on May 1, 2013. The entire disclosure of each of these patent applications is incorporated by reference into this application for all purposes.

FIELD OF THE INVENTION

The present invention relates in general to microscopy systems. In particular, the present invention relates to a microscope having an adjustable display apparatus.

BACKGROUND OF THE INVENTION

Microscopy is an essential tool to researchers across the entire life science field. Conventional microscopes are bulky, cumbersome to use, and often too sophisticated for simple tasks. In conjunction with microscopy, fluorescence is used in the life sciences as a non-destructive way of tracking or analyzing biological molecules by means of the fluorescent emission at a specific frequency. A biological compound can be labeled with a fluorescent marker (i.e. an extrinsic fluorophore) that can be a small molecule, protein, or quantum dot which, when excited by light at a specific wavelength, fluoresces. Other naturally or intrinsically fluorescent biological materials may also react and emit light when triggered with an excitation light. Different markers fluoresce in response to different wavelengths of excitation light.

The demand for alternative imaging instruments that can meet such needs of researchers in modern laboratories has been increasing in recent years, leading to the existence of products such as LumaScope™ (from Etaluma, Inc.) and FLoid® (from Life Technologies Corporation), which can provide small-size digital imaging, with the expected associated benefits of portability and ease of use. The products that exist in the field, however, continue to lack capabilities which are needed by researchers.

BRIEF SUMMARY OF THE INVENTION

Embodiments of the invention include a method of controlling a display for a digital microscope. The method receiving first imaging information from an camera unit of the digital microscope, receiving positioning information including a position of a lens of the camera unit with respect to a sample under inspection on a sample stage of the digital microscope, receiving control information from a control interface operable to receive user control inputs, wherein the control information includes commands for performing focusing functions with respect to images of the sample under inspection as displayed on the display screen of the digital microscope, receiving second imaging information from an orientation camera disposed above the sample under inspection on the sample stage of the digital microscope, and displaying images of the sample under inspection on a display of the digital microscope based on the positioning information and the control information.

Other embodiments of the invention include a display system for a digital microscope comprising a controller having a processor and a memory coupled therewith via an interconnect bus, the memory adapted to store modules and instructions for operating the display system of the digital microscope, an imaging interface coupled with the controller and configured to receive first imaging information from an camera unit of the digital microscope, a positioning interface coupled with the controller and configured to receive positioning information including a position of a lens of the camera unit with respect to a sample under inspection on a sample stage of the digital microscope, a user control interface coupled with the controller and configured to receive control information based on user control inputs, wherein the control information includes commands for performing focusing functions with respect to images of the sample under inspection as displayed on the display screen of the digital microscope, an orientation camera interface coupled with the controller and configured to receive second imaging information from an orientation camera disposed above the sample under inspection on the sample stage of the digital microscope, a display screen, and a display module configured to display images of the sample under inspection on the display screen of the digital microscope based on the positioning information and the control information.

Other embodiments of the invention include a digital microscope comprising a magnification lens, a camera unit coupled with the magnification lens and adapted to provide first imaging information with respect to samples under inspection, a sample observation stage adapted to receive samples thereon for inspection by the digital microscope, an orientation camera disposed above the sample observation stage and adapted to provide second imaging information with respect to the samples under inspection, and a display screen configured to display images of the samples under inspection based on the first imaging information and the second imaging information.

And yet other embodiments of the invention include method of using a digital microscope comprising receiving first imaging information with respect to samples under inspection from a camera unit coupled with a magnification lens of the digital microscope, receiving second imaging information from an orientation camera disposed above a sample observation stage that holds the samples for inspection by the digital microscope, and a display screen configured to display images of the samples under inspection based on the first imaging information and the second imaging information.

These and other embodiments are described in further detail below.

DETAILED DESCRIPTION OF THE INVENTION

Figure 1:
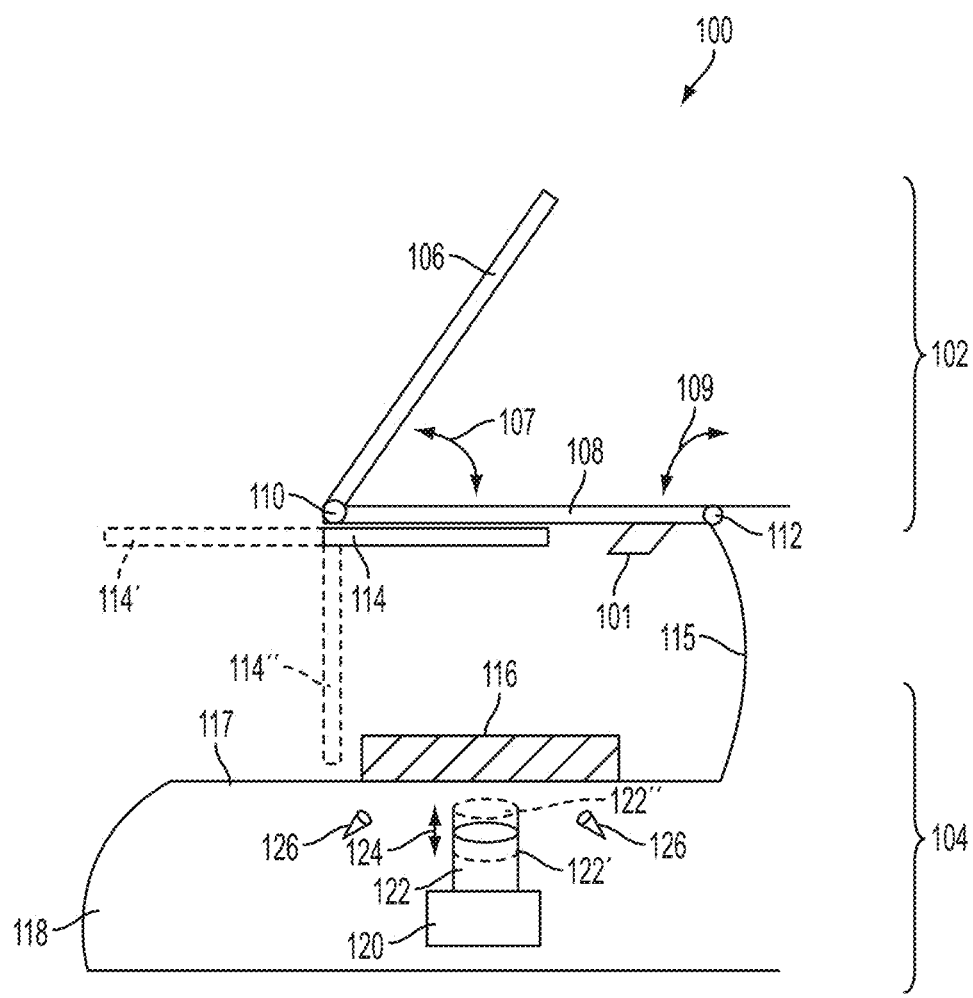
FIG. 1 shows a schematic representation of a microscope having an adjustable digital display according to an embodiment of the invention.

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

The present invention relates to microscopes rendering digital images of samples, with the capability to control the focus of the microscope system, and the software used to control the operation of the digital microscope system. Further, the present invention relates to a microscope structure that allows for compact and multi-functional use of a microscope, providing for light shielding and control with samples that require exposure to specific light wavelengths for detection, fluorescence, and imaging.

The adjustable digital microscope instrument according to the present invention possesses several features that make the instrument ideal for increasing efficiency and usability of the instrument. In one aspect, the adjustable digital microscope instrument has an elevated assembly structure that can be adjusted, tilted, or, folded into several positions. The elevated assembly structure includes a digital display screen which displays to a user images and information from objects on the sample stage of the microscope. In one embodiment, the display screen can be a liquid crystal display ("LCD") screen with touch screen functionality. The ability to adjust the elevated assembly structure allows for several advantages.

First, the elevated assembly structure can be pushed or tilted back to allow for ease of sample exchange on the sample stage. Second, the adjustable display screen can accommodate a users' viewing angle, e.g. from a sitting or standing position, or to account for glare from an external light source. Third, components of the elevated assembly can be partially or completely folded down and act as an awning, such that the elevated assembly at least partially covers the sample stage and effectively blocks external light from reaching the sample stage. By allowing the elevated assembly structure to adjust in this manner, serving the additional purpose of operating as an awning, the elevated assembly structure can provide the necessary darkness for fluorescent image acquisition.

The adjustable digital microscope instrument according to the present invention can also include a thumbnail region on the display screen. The thumbnail region is a relatively smaller window digitally displayed on the display screen, which can be shown at various positions on the screen. The thumbnail region can display information about the sample (currently or previously) under examination, including information such as indicating the type of sample vessel used, the location (an area or more precise spot location) where the imaging apparatus is directed as the vessel moves around in real time, or other information relating to the viewed sample. In part, the thumbnail region helps users remain aware of the position of imaging location, though use of a pointer or indicator overlaid in the thumbnail region, as the user manipulates a sample or vessel on the sample stage. The thumbnail region can also display information about the adjustable digital microscope instrument itself such as the status of the instrument as it is in use, the magnification factor, or wavelength of light incident on the viewed object.

In another aspect, control of the display of the adjustable digital microscope allows for direct control of functions including panning, zoom, and magnification, as well as both "coarse" and "fine" control of the focal plane viewed by the microscope. The controls can be on the display screen and operable by touch. In another aspect, the focusing controls can be placed adjacent to the display screen in the form of a mechanical dial and/or focusing buttons (e.g. "up" and "down" buttons to increase and decrease the height of the viewed focal plane). The presence of the controls on or adjacent to the display screen allows for convenient operation of the controls that is unobstructed by other structures.

A dial and/or focusing buttons can be provided that are configured to control coarse and/or fine focal plane adjustment of the instrument. These digital controls represent an improvement over the conventional co-axial knobs used for focal control on microscopes. The dial and focusing buttons may work concurrently or independently, and various embodiments of the invention may include both a mechanical dial and focusing buttons, or only one of these two control mechanisms. In another embodiment of the invention, there may be a separate button or control input that can switch the focusing controls between coarse and fine increments. The mechanical dialing and pressing of these controls can transmit electric signals that digitally present the objects in the focal plane as an image shown on the display screen.

An adjustable digital microscope according to many embodiments of the present invention provides for significant advantages in workflow processing for users. A sample and/or sample vessel can be easily placed onto the sample stage of an adjustable digital microscope, where the ease of placement and orientation due in part to the adjustability of the elevated assembly. Once under observation, the sample can be found within the sample vessel by changing the height of the focal plane, and the location of the area being viewed on the screen of the microscope can be specified with an indicator generated within the thumbnail region overlaid on the image in the display screen. In other embodiments, the thumbnail can be within the display screen but not overlaid on the image displayed therein.

When optionally shielded from ambient light, the samples under observation can be exposed to specific wavelengths of light (i.e. different colors of light) that can cause specific markers associated with the sample(s) to fluoresce. The images of the fluorescing samples can then be captured and stored in a computer-readable media or memory coupled with the microscope. Further, the images can be subsequently organized and/or merged with other images captured by the digital microscope. In one embodiment, the images are captured while the sample(s) were excited by different wavelengths of light and causing different markers to fluoresce. The merger of images of the same sample(s) also allows for the creation of a multi-color image showing multiple fluorescing markers (and thus the related sample targets) in the same image. Additionally, post-processing functions can be performed on the images captured by the microscope.

Further, with a digital microscope according to embodiments of the invention, data can be entered in relation to the observed samples, through a software generated keyboard and functionality buttons on the touch screen and/or through an external keyboard electrically connected to the microscope.

FIG. 1 is a schematic representation of an adjustable digital microscope 100 according to an embodiment of the invention. The adjustable digital microscope 100 has two primary regions, the elevated assembly 102 and the sample stage 104. In the illustrated embodiment, the elevated assembly 102 is coupled with the sample stage 104 by vertical core support 115 and an elevated assembly hinge 112. The elevated assembly 102 includes a display screen layer 106 coupled with a light control or light source layer 108 via a display screen layer hinge 110. In one embodiment, the light source layer includes light emitting diodes ("LEDs") as the light sources. Other light sources and configurations are possible within the scope of the techniques described herein. In FIG. 1, the elevated assembly includes an orientation camera 101 positioned above the sample stage, and a light shield 114. The sample stage 104 has a base portion 118, the top of which defines a sample deck 117, on top of which is a sample imaging area 116 where various samples and vessels can be placed and manipulated while being imaged by the orientation camera 101. In embodiments of the invention, and as defined herein, the display screen layer hinge 110 and the elevated assembly hinge 112 may be any structure that allows for the turning or pivoting of an identified structural element relative to another structural element (e.g. a ball-and-socket assembly).

The display screen layer 106 and the light source layer 108 can move in a rotatable manner around the turning axis of the elevated assembly hinge 112, to which the light source layer 108 is mechanically coupled. The direction of the range of motion for the elevated assembly 102 facilitated by the elevated assembly hinge 112 is indicated as element 109 in FIG. 1. Similarly, the display screen layer 106 can move in a rotatable manner around the turning axis of the display screen layer hinge 110, to which the display screen layer 106 is mechanically coupled. The direction of the range of motion for the display screen layer 106 facilitated by the display screen layer hinge 112 is indicated as element 107 in FIG. 1. In alternative embodiments of the invention, the elevated assembly 102 can move relative to the sample stage 104 along at least one turning axis, with each turning axis having a distinct range of motion. Similarly, in an embodiment of the invention, the elevated assembly 102 can be adjustable along at least two degrees of freedom, along different axes, such as the axes defined by the turning axis of the display screen layer hinge 110 and the turning axis of the elevated assembly hinge 112.

In the embodiment of the invention illustrated in FIG. 1, the light shield 114 resides in a position, under and mechanically connected to the light source layer 108, such that in its default position, the light shield 114 is recessed and does not present an obstacle to handling objects on the sample stage 104. In such a recessed position, the light shield 114 may block light from light sources, such as LEDs, on the underside of the light source layer 108. The light shield can be extended to a first shielding position 114', which may be an extension out forward from the adjustable digital microscope 100, i.e. toward the user, or out toward the sides of the adjustable digital microscope 100. There may be more than one light shield 114, each of which can extend in a different direction, to a first extended shielding position 114', from the elevated assembly support structure 112. The light shield(s) 114 can extend and retract from the bottom of the elevated assembly support structure 112, blocking out ambient light as necessary.

In other embodiments of the invention, one or more light shields 114, when in a recessed position, may reside inside the structural frame of the light source layer 108, and extend therefrom to an ambient light blocking position. In such embodiments, the one or more light shields 114 when recessed within the structural frame of the light source layer 108 allow for a more convenient operation of the adjustable digital microscope 100 when, for example, changing the height or angle of the light source layer 108 along the turning axis of the elevated assembly hinge 112. In further embodiments of the invention, one or more light shields 114 may be connected to the light source layer 108 with a hinge (not shown) such that the one or more light shields 114 can be moved to a second extended shielding position 114", which can more completely block ambient light from being incident on the sample deck 117 and sample imaging area 116. In other words, the light shield 114 which can extend to the front and sides of the adjustable digital microscope 100, i.e. to a first shielding position 114', may further be configured to fold down to a second extended shielding position 114", forming vertical walls to provide partial or complete wrap-around blockage of ambient light from reaching the sample deck 117.

The orientation camera 101 may be located on the underside of the light source layer 108, i.e. the side proximate to the sample deck 117, in a position that is central relative to light sources (e.g., LEDs) also located on the underside of the light source layer 108. The orientation camera 101 may be located in alternative locations mounted to the light source layer 108 or the vertical core support 115, provided that the light sources of the light source layer 108 do not adversely affect the image captured by the orientation camera 101 due to the angles at which the sample imaging area 116 is lit. The orientation camera 101 is electrically connected to the display screen and thumbnail region of the display screen layer 106, and functions to provide information regarding the presence and/or identity of a sample vessel in the sample imaging area 116, and the location of where in a sample imaging area 116 an imaging camera 120 is viewing. The orientation camera 101 can be a digital imaging capture apparatus which sends digital images of objects on the sample stage 104 to the display of the display screen layer 106.

The orientation camera 101 operates in conjunction with the light sources of the light source layer 108, which in many embodiments of the invention are LEDs, where in a preferred embodiment, light source layer 108 has white light LEDs mounted on the underside of the light source layer 108. The light provided by the LEDs mounted on the underside of the light source layer 108 provides light for the orientation camera 101 to image an object on the sample deck 117 and/or in the sample imaging area 116. This light may be necessary when the light shield(s) 114 are in extended shielding positions 114' or 114", and ambient light is generally blocked from entering the sample deck 117 area. The LED lights or other light sources can be configured to immediately and automatically switch off when the light shield(s) 114 are retracted, and become enabled again only when the light shield(s) 114 are extended.

Inside the sample stage base portion 118, an imaging camera 120 is located below the sample imaging area 116. The sample deck 117 has an opening or transparency positioned such that the imaging camera 120 can visualize and capture images of sample vessels and samples located in the sample imaging area 116. The imaging camera 120 is electrically coupled with the display screen of the display screen layer 106 such that images from the imaging camera 120 can be presented to a user on the display screen. In alternative embodiments of the invention, the imaging camera 120 may additionally be electrically coupled to the thumbnail region of the display screen layer 106. The imaging camera includes 120 a lens apparatus 122 which can be raised or lowered along the direction of motion indicated as element 124 in FIG. 1.

The imaging camera 120 and lens apparatus 122 are electrically coupled with focusing controls (not shown) present on the display screen layer 106 and/or focus control software accessible through the interface presented on the display screen. Based on control input received from a user through the focusing controls of the display screen layer 106, the lens apparatus can be lowered to positions further from the sample imaging area up until a minimum lens apparatus height 122'. Similarly, based on control input received from a user through the focusing controls of the display screen layer 106, the lens apparatus can be raised to positions closer to the sample imaging area up until a maximum lens apparatus height 122". A motor (not shown), such as a step motor or pneumatic motor, is electrically coupled with the focusing controls of the display screen layer 106 and can be located within the base portion 118, or even further within the imaging camera 120. The motor can be mechanically connected to the lens apparatus 122 to raise or lower it in response to inputs from the focusing controls of the display screen layer 106.

In one embodiment, the lens of the lens apparatus 122 can be a prime lens (i.e. a lens with a fixed focal length), thus, as the lens apparatus moves from a minimum lens apparatus height 122' through the lens apparatus range of motion 124 to a maximum lens apparatus height 122", the focal plane viewed by the imaging camera 120 will move through the sample imaging area 116. In many embodiments of the invention, the controls that adjust the position of the lens apparatus 122 and the height of the focal plane viewed by the imaging camera 120 can be the focusing controls described in FIGS. 3A, 3B, 3C, and 3D below. In such embodiments, operation of a first focusing button 310 of FIGS. 3A-3B causes the motor to raise the lens apparatus to a point close to the sample deck 117, and thus shift the height of the focal plane further up through the sample imaging area 116. The lens apparatus 122 will reach a maximum height 122" and stop ascending before making contact with the underside of either the sample deck 117 or any sample vessel residing in the sample imaging area 116. Similarly, the operation of a second focusing button 312 of FIGS. 3A-3B causes the motor to lower the lens apparatus 122 to a point more distant from the sample deck 117, and thus shift the height of the focal plane further down through the sample imaging area 116. The lens apparatus 122 will be configured to reach a minimum height 122' and stop descending based on the physical tolerances of the imaging camera 120.

Likewise, a focusing dial 308 of FIGS. 3C-3D can be configured to control the height of the lens apparatus 122, and particularly configured so as not to force the lens apparatus 122 above the maximum height 122" or below the minimum height 122'. The focusing dial 308 of FIGS. 3C-3D can be built in conjunction with a physical limitation mechanically coupled to the focusing dial 308 that prevents the dial from rotating too far in any one direction along its turning axis, thus preventing the focusing dial from directing the lens apparatus (via the motor) to move to too high or too low a height. In another embodiment, the focusing dial 308 can be configured in conjunction with operational software so that once the lens apparatus 122 reaches its maximum height 122" or minimum height 122', the motor moving the lens apparatus 122 simply ignores further instructions to raise or lower the lens apparatus 122, respectively.

Additionally, in cases where the lens apparatus 122 is approaching or reaches either its maximum height 122" or minimum height 122', the adjustable digital microscope 100 may also be configured to emit a warning signal notifying users that an extreme position of the lens apparatus 122 has been reached. Such a warning can be an audible beep from a speaker in the instrument or other such sound, or can be a visual queue presented on the display screen 304, or a combination of both audible and visual warnings.

Further, colored light sources 126 (e.g., non-white light LEDs, and alternatively referred to as colored light LEDs 126) can be located within the base portion 118 and arranged such that the light emitted from the colored light sources 126 passes through the opening or transparency in the sample deck 117 and illuminates the sample imaging area 116. The colored light sources 126 may emit red, orange, yellow, green, blue, purple, or other wavelengths of light, and the colored light LEDs 126 can be configured such that light of only one wavelength is emitted at any one point of time or for any one period of time. Alternatively, the colored light LEDs 126 can be configured such that more than one wavelength of light is emitted concurrently. Further, the colored light LEDs 126 can be configured such that specific wavelengths of light are emitted in a timed and/or ordered sequence. The colored light LEDs 126 can optionally be used in concert with white light sources, such as white light LEDs, residing within the light source layer 108 or elsewhere on and/or within the adjustable digital microscope 100. When light of a specific wavelength (or wavelength range specific to a particular color of light) is emitted from the colored light LEDs 126, markers present in a sample or sample vessel located in the sample imaging area may fluoresce in response to the specific wavelength(s) of light. The images captured of objects in the sample imaging area 116 by the imaging camera 120 can be stored on computer-readable media, displayed to a user on the electrically connected display screen, and then optionally can be subjected to software implemented post-imaging processing, including but not limited to managing contrast of the images, merging separate images, cropping images, and other image processing operations.

The adjustable digital microscope 100 can also have a mechanism for storing and transmitting data on its memory or computer-readable media to external sources. The mechanism for transferring data can be through any wired or wireless connection to a computer system independently operated from the adjustable digital microscope 100. The adjustable digital microscope 100 can also have at least one port into which a computer-readable medium or memory device can be inserted, onto which data from the adjustable digital microscope 100 can be saved. In one embodiment, the port is a standard Universal Serial Bus ("USB") port. Such a port can be positioned on the adjustable digital microscope 100 in a location which is easily accessible to a user while the adjustable digital microscope 100 is either in use and/or not in use.

Figure 2A:
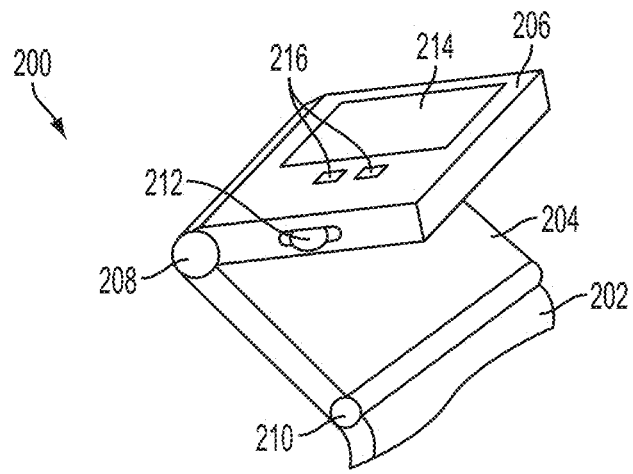
FIG. 2A shows a perspective view of an elevated assembly of an adjustable digital microscope display according to an embodiment of the invention in a first configuration.
Figure 2B:
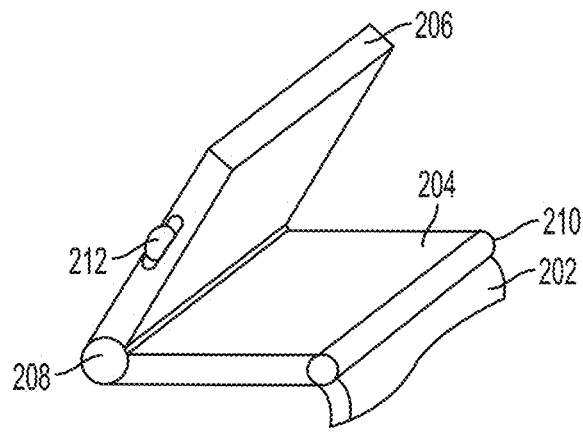
FIG. 2B shows a perspective view of an elevated assembly of an adjustable digital microscope display according to an embodiment of the invention in a second configuration.
Figure 2C:
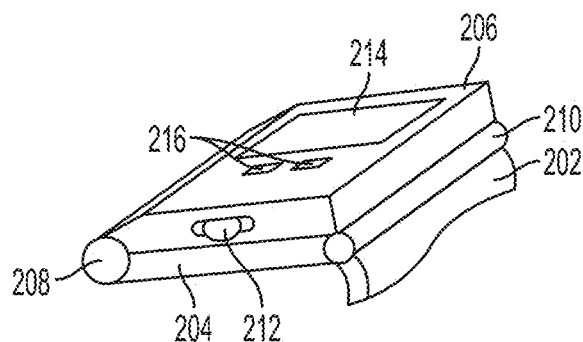
FIG. 2C shows a perspective view of an elevated assembly of an adjustable digital microscope display according to an embodiment of the invention in a third configuration.

FIGS. 2A, 2B, and 2C show various perspective views of an elevated assembly of the adjustable microscope display 200 according to various embodiments of the invention, which is located above the sample stage of the microscope. FIGS. 2A, 2B, and 2C show the elevated assembly 200 in progressive configurations, which each allow for particular aspects of operation of the device. In the illustrated embodiments, the primary components of the elevated assembly are the elevated assembly support 202, which connects the elevated assembly to the rest of the microscope, the light source layer 204 (a light control layer), and the display screen layer 206.

The elevated assembly support 202 is mechanically connected to the elevated assembly hinge 210, which is in turn connected to the back edge of light source layer 204. The front edge of light source layer 204 is mechanically connected to the display screen layer hinge 208, which is in turn mechanically connected to the bottom edge of the display screen layer 206. Accordingly, as is evident in FIGS. 2A, 2B, and 2C, the light source layer 204 and the display screen layer 206 can move while being coupled with each other along the turning axis of the elevated assembly hinge 210. Similarly, the display screen layer 206 can move along the turning axis of the display screen layer hinge 208 to be closer to or further from the light source layer 204.

FIG. 2A shows the elevated assembly 200 in a configuration where the light source layer 204 and the display screen layer 206 are both in a raised position relative to the elevated assembly support 202. FIG. 2A shows the display screen layer 206 in a raised position relative to the light source layer 204, but the display screen layer 206 may be folded downward along the turning axis of the display screen layer hinge 208 such that the display screen layer 206 and light source layer 204 are closer to and/or in contact with each other when both layers are in a raised position relative to the elevated assembly support 202. The light source layer 204 and the display screen layer 206 are mechanically connected to each other via the display screen layer hinge 208, and the display screen layer is further mechanically connected to the elevated assembly hinge 210. Accordingly, the light source layer 204 and display screen layer 206 can move together along the turning axis of the elevated assembly hinge 210 and are thus able to be adjusted in terms of height and angle according to the tolerances of the elevated assembly hinge 210. LED light sources (not shown) are located on the side of the light source layer 204 that is proximate to the sample stage (not shown), which can be referred to as the underside of the light source layer 204. The LED light sources can be single LEDs, rows of LEDs, or other arrangements of LEDs set in various configurations to illuminate a sample stage below the elevated assembly 200. In a preferred embodiment, the LED light sources in the light source layer 204 are white light LEDs. In other embodiments of the invention, alternative light sources on the underside of the light source layer 204 may be used to produce light of different wavelengths. The display screen layer 206 includes a focus control dial 212 located on a side of the display screen layer 206 frame. The focus control dial 212 has a central axis perpendicular to majority surface area of the display screen layer 206, and thus the focus control dial 212 is operable to rotate along the (adjustable) axis of the display screen layer 206. Use of the focus control dial 212 allows for an increase or decrease in focal length of the lens and camera capturing the image displayed to a user. In this configuration, ambient light may be incident on the sample stage, and sample vessels may be easily moved on to and/or off of the sample stage deck.

FIG. 2B shows the elevated assembly 200 in a configuration where the light source layer 204 is in a lowered position relative to the elevated assembly support 202 and the display screen layer 206 is in a raised position relative to the light source layer 204. In this configuration, significant portion of ambient light will be blocked from entering the sample stage by the presence of the light source layer 204 acting as a cover or awning over the sample stage. Further, in this configuration, the display screen layer 206 may be in a position that is easily viewed and operated by a user. The light sources of the light source layer 204 may provide the only light incident on the sample stage. In an aspect, the light source layer 204 functions to serve as an awning to provide protection for direct light required for operations such as fluorescent image capture, and can either move with the sample stage together as one piece, or stay stationary, independent of the sample stage movement.

FIG. 2C shows the elevated assembly 200 in a configuration where the light source layer 204 and the display screen layer 206 are both in a lowered position relative to the elevated assembly support 202. The display screen 214 and focus control buttons 216 are present on the side of the display screen layer distal from the sample stage. The display screen 214 receives electrical signals from the one or more image capturing components of the microscope and displays the resultant image and/or images. In embodiments of the invention, the display screen 214 is a touch screen which can allow for the manipulation of the digital image presented, the touch screen being operable by a user wearing latex gloves, nitrile gloves, other gloves commonly used in a laboratory, or by a user not wearing gloves.

The focus control buttons 216 allow for an increase or decrease in focus of the image displayed to a user. The focus control buttons 216 may be used independently or in tandem with the focus control dial 212, and in embodiments of the invention, both or only one of the focus control structures may be present. In this configuration, the focus controls are operable by a user and the instrument has relatively compact form factor; the tolerance of the elevated assembly hinge 210, however, does not allow the elevated assembly 200 to move toward the sample stage to a position below the horizontal plane parallel to the sample stage deck. Further, in this configuration, a significant portion of ambient light will be blocked from entering the sample stage by the presence of the light source layer 204 and display screen layer 206, acting as a cover over the sample stage. Thus, the light source layer 204 and display screen layer 206 function to serve as an awning to provide protection from direct light, as required for operations such as fluorescent image capture, and can either move with the sample stage together as one piece, or stay stationary, independent of the sample stage movement.

As illustrated in FIGS. 2A, 2B, and 2C, the display screen 214 can be adjusted to be presented at different angles, which allows for viewing of the display screen 214 by a user in either standing or sitting position. The ability to adjust the display screen layer 204 by tilting, folding, or otherwise adjusting along the turning axis of the display screen layer hinge 208 allows for accommodation of a users' viewing angle from a sitting or standing position, or to account for glare. Similarly, the ability to adjust the angle of the display screen layer 206 and/or light source layer 204 allows these layers, and the elevated assembly 200 as a whole, to be positioned and/or tilted away from the user to allow for an easy and unobstructed exchange of sample containers (e.g. sample "cassettes") on the sample stage.

Further, the ability to adjust the display screen layer 204 permits its use as an awning which can occlude ambient light from the sample stage. In embodiments of the invention, display screen 214 may be a touch screen responsive to either capacitive or inductive stimulus or triggers. The touch screen allows a user to interact with the image presented on the multi-touch display surface. The touch screen allows user to directly control the digital microscope, with controls including, but not limited to, increasing or decreasing the exposure time of the image captured, panning across the image, and magnification of the image.

FIGS. 3A, 3B, 3C, and 3D show a block diagram representations of display screen layer configurations 300 including the display screen layer 302 (element 206 in FIGS. 2A, 2B, and 2C) and display screen 304 (element 214 in FIGS. 2A, 2B, and 2C) with focusing controls. As described above, the display screen 304 can be an LCD touch screen display, although other the embodiments described herein are not so limited and can include other types of touch screen display devices.

In the illustrated embodiments of FIGS. 3A-3D, display screen 304 includes a thumbnail region 306 (i.e. a software-generated inset display window on the display screen 304) which can be superimposed on the images captured by the microscope to assist users awareness of where they are in a particular magnified image, which can at times be difficult to determine from just the magnified image alone. The thumbnail region 306 can provide a larger viewing area of the sample on the microscope stage. Images shown in the thumbnail region 306 are provided by an orientation camera, such as camera 101 of FIG. 1, which provides a larger viewing area to orient users to the sample on the sample stage. In one embodiment, the orientation camera is a wide-angle viewing camera. The orientation camera 101 can be positioned above the sample stage on the underside of the light source layer 108 of FIG. 1, i.e. the side proximate to the sample deck 117. The orientation camera 101 can also be positioned with additional illumination for viewing this larger sample area when needed. To accomplish this, the orientation camera 101 can be positioned in a central location relative to light sources on the underside of the light source layer 108. In addition, orientation camera 101 is in electrical communication with the display screen 304 which is operable to display the images captured by the orientation camera 101 in the thumbnail region 306 onto the images captured by the microscope lens of the imaging camera 120 and shown on the display screen 304.

The thumbnail region 306 provides users with the location of a sample in the imaging area 116. Images presented in the thumbnail region 306 can identify a region within the sample vessel with a digital indication to orient the user as to the current imaging area of the vessel within the larger image of the sample. The thumbnail region 306 allows users to view the larger sample area for purposes of moving or replacing the sample under examination before detailed inspection using larger magnification provided by the microscope lens 122. The images produced by the larger viewing area in the thumbnail region 306 can be projected onto the display screen 304 either before a user switches to the magnified image from the microscope lens or it can be displayed in picture-in-picture mode at some position within the display screen 304 while the magnified image from the microscope lens is shown on the same display screen.

In addition, the thumbnail region 306 can include a pointer or indicator within the thumbnail region 306 which can be used to aid a user in keeping track of what section of a sample the user is observing in the display screen 304. The pointer or indicator can be represented with one or more structures, such as an arrow, a cross-hair marker, a bulls-eye, a colored dot (having a color in contrast with the underlying image or illustration), or any other pointer or indicator that can be superimposed on the image of the orientation camera 101 by software or using a mechanical mark to pin-point the center of the image in the thumbnail region 306. The pointer or indicator can be digitally generated with a solid, translucent, or outline form. The pointer or indicator can also be physically superimposed within the thumbnail region 306, and calibrated to consistently be located at the point of focus.

The thumbnail region 306 can also include information about the particular vessel and/or sample in the imaging area of the sample stage. The thumbnail region 306 can convey information such as the vessel type (i.e. whether the vessel is a flask, plate, series of tubes, etc.) and can also update concurrently in real time as either the sample or the sample vessel moves on the sample stage. In further embodiments of the invention, the representation of the sample vessel imaged within the thumbnail region 306 can be (1) an actual image of the sample vessel captured with an image capture device, (2) an illustrated representation of the sample vessel (e.g. a wireframe illustration indicating major structural components of the sample vessel), or (3) a hybrid of an actual image and an illustrated representation of the sample vessel.

The display screen 304 and the thumbnail region 306 can both, separately or concurrently, display information regarding the sample and/or sample vessel viewed by the microscope. This information can include, but is not limited to (1) the time at which the image is being observed (with a related timestamp), (2) the wavelength and/or color of light illuminating the sample stage area, (3) the intensity of the light illuminating the sample stage area, (4) any name manually assigned (either automatically or individually) to the sample or sample vessel, (5) the type of sample vessel being observed, (6) the location of the viewed image within the sample vessel, (7) the focal plane of the microscope used to observe the viewed image, (8) exposure time of the image, (9) the magnification factor used to observe the viewed image, (10) any other information related to the viewed sample and/or sample vessel, (11) and/or any combination of this information.

Users can also control the instruments of the microscope directly on the display screen by touch, including functions such as panning and zooming, etc. The location of the focusing and magnification controls on the display screen layer 302 can be designed to be operated one-handed, allowing the other hand to be used for other tasks such as manipulating the sample or vessel holding the sample. The focusing controls on the display screen layer 302 are also designed to have a comfortable feel while operating the controls. As used herein, "fine" control of focus means increasing or decreasing the height of the focal plane by less than one micron (<1 µm) and "coarse" control of focus means increasing or decreasing the height of the focal plane by no less than ten microns (≥10 µm). Further, the focusing granularity of adjustable digital microscopes according to the present invention can be configured to be "fine" or "coarse", or other degrees of granularity for changing the height of the focal plane, relative to the needs of the user of the microscope.

Moreover, focusing levels between and/or greater or less than pre-defined "fine" and "coarse" focus levels can be set and used by adjustable digital microscopes. As the height of the focal plane changes, the image of the sample and sample vessel in the sample stage which is captured by the lens apparatus and camera, and transmitted to and viewed on the display screen 304, changes accordingly. This functionality allows a user to move the focus of the microscope through a sample vessel and sample to a desired location and height to observe a sample, and to capture the image of the observed focal plane of the sample with a camera. In embodiments of the invention, the control of the height of the focal plane can be done with the mechanical buttons and dials described herein and also with controls presented on the display screen 304.

Figure 3A:
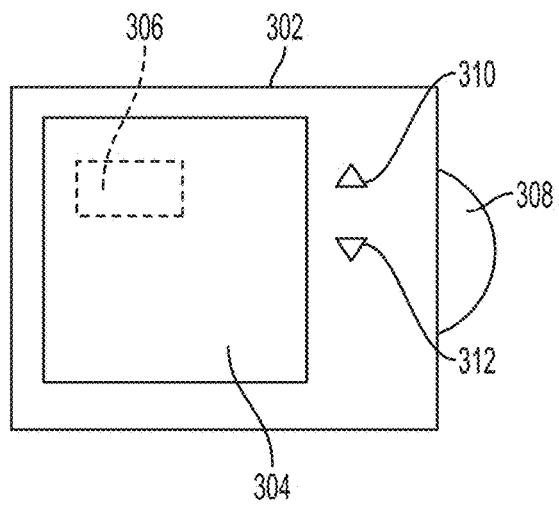
FIGS. 3A, 3B, 3C, and 3D are block diagram representations of a display screen with focusing controls according to various embodiments of the invention.

FIG. 3A depicts a block diagram representation of an embodiment of the invention, showing display screen layer 302 with focusing controls, specifically, a focusing dial 308, a first focusing button 310 and a second focusing button 312. The focusing controls allow a user to change the image displayed on the screen display 304 by altering the location (i.e. height) of focal plane viewed by the lens and camera below the sample stage, thus adjusting where within the object (i.e. the sample vessel and sample) on the sample stage the microscope is viewing. The lens below the sample stage can be a fixed focal length lens, thus when the lens is moved, the focal plane that the camera views moves accordingly. In such an embodiment, the adjustable digital microscope can be configured such that the focusing dial 308 can control the height of the focal plane in coarse increments and the first focusing button 310 and second focusing button 312 control the height of the focal plane in fine increments. Conversely, in such an embodiment, the adjustable digital microscope can be configured such that the focusing dial 308 can control the height of the focal plane in fine increments while the first focusing button 310 and second focusing button 312 control the height of the focal plane in coarse increments.

Figure 3B:
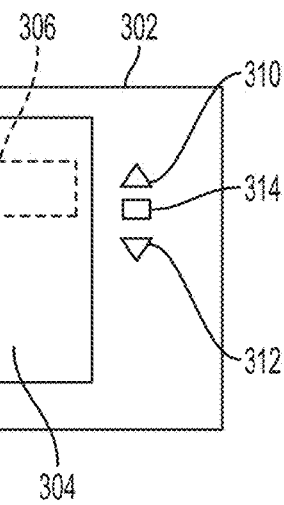

FIG. 3B is a block diagram representation of an embodiment of the invention, showing an display screen layer 302 with focusing controls, specifically, a first focusing button 310, a second focusing button 312, and a focus mode switch button 314. In such an embodiment, the first focusing button 310 and second focusing button 312 can control an increase or decrease in the height of the focal plane while the focus mode switch button 314 can change the degree of focal plane height change caused by use of the first focusing button 310 and second focusing button 312. The focus mode switch button 314 can alternate between coarse or fine increments for increases or decreases in the height of the focal plane, or in increments between, greater than, or less than pre-defined coarse and fine increments.

Figure 3C:
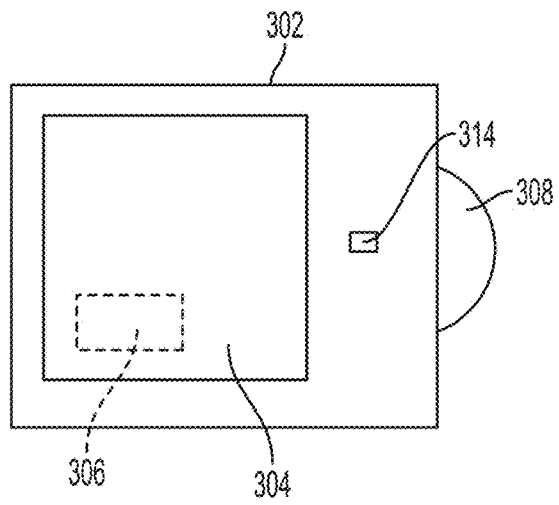

FIG. 3C is a block diagram representation of an embodiment of the invention, showing an display screen layer 302 with focusing controls, specifically, a focusing dial 308 and a focus mode switch button 314. In such an embodiment, the focusing dial 308 can control an increase or decrease in the height of the focal plane while the focus mode switch button 314 can change the degree of focal plane height change caused by use of the focusing dial 308 to be in coarse or fine increments, or in increments between, greater than, or less than pre-defined coarse and fine increments.

Figure 3D:
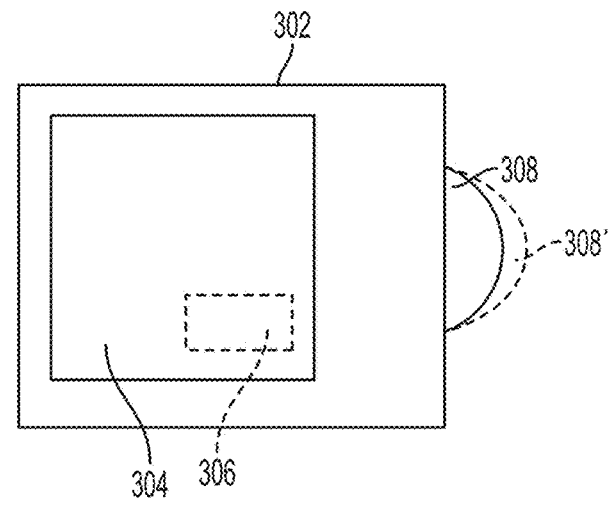

FIG. 3D is a block diagram representation of an embodiment of the invention, showing an display screen layer 302 with focusing controls, specifically, a focusing dial (in its default position) 308 which can move to at least a secondary position 308'. In such an embodiment, the focusing dial 308 can control an increase or decrease in the focal plane height, and whether the focusing dial 308 changes the focal plane height in either coarse or fine increments, or any other degree of movement granularity, is controlled by whether the focusing dial is in its default position 308 or if it is in its secondary position 308'. For example, if the focusing dial 308 when operated (in its default position) causes the related camera and lens apparatus to change focal plane height on a relatively coarse scale, then when the focusing dial is in its secondary position 308', operation of the dial would cause the related camera and lens apparatus to change focal plane height on a relatively fine scale. Further, the focusing dial may have more than two functional positions, allowing for changes the degree of focal plane height change caused by use of the focusing dial 308 in increments including, between, and beyond pre-defined coarse and fine increments. In embodiments of the invention, the focusing dial 308 may operate in a tertiary position, allowing for changes to the height of the focal plane distinct from changes in the focal plane height when the focusing dial 308 is in either a default primary position or a secondary position 308'. Similarly, the focusing dial 308 may operate at any position between a primary position and a secondary position 308', such that the change to the focal plane height of a related camera and lens apparatus is related or proportional to the position of the focusing dial 308 relative to the primary and secondary positions.

Figure 3E:
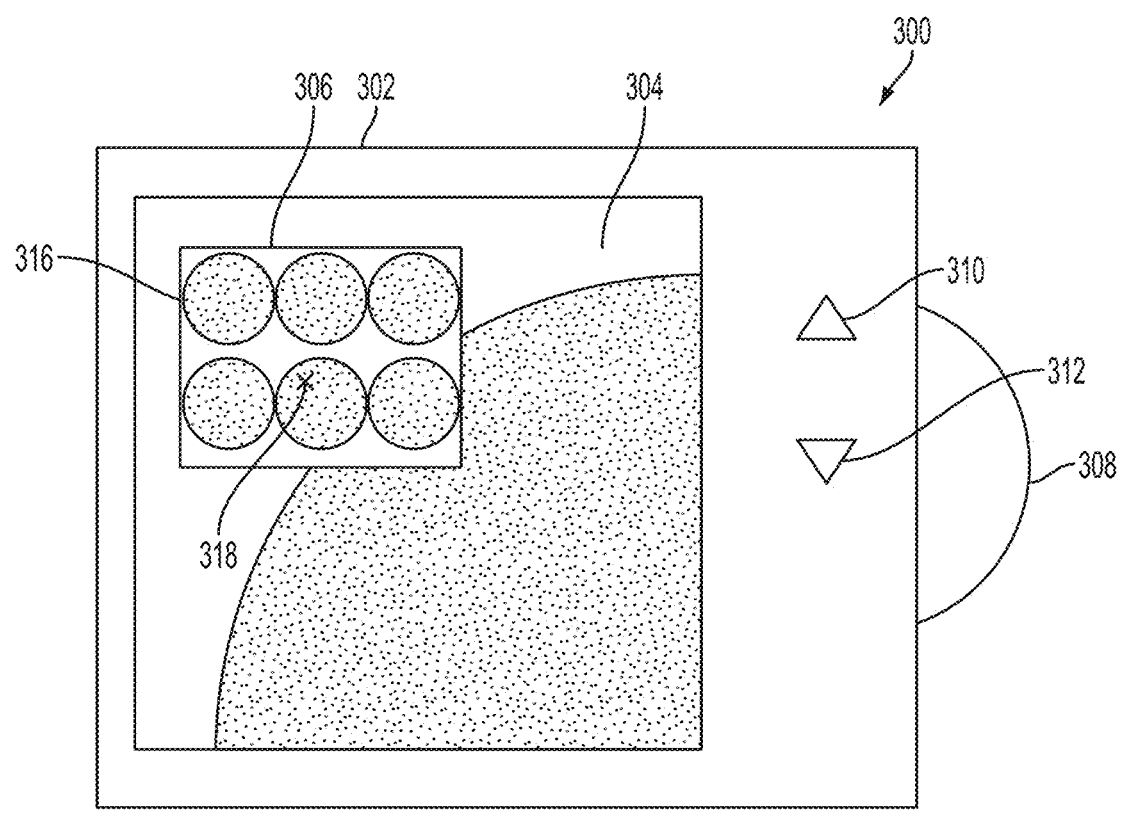
FIG. 3E is a block diagram representation of an alternate view of a display screen with focusing controls for the display screen.

FIG. 3E is a block diagram representation of the display screen layer 302 and display screen 304 with focusing controls 308, 310, and 312 for the display screen 304 with further detail regarding the thumbnail region 306. The thumbnail region 306 further illustrates an exemplary representation of a sample vessel viewed by the digital microscope instrument, the sample vessel having six wells 316. The representation of the sample vessel shown in the thumbnail region 306 can be a live or recorded image captured by the orientation camera on the digital microscope. Alternatively, the representation of the sample vessel shown in the thumbnail region 306 can be an illustration (such as a wireframe illustration) of the sample vessel highlighting critical features of the sample vessel. A pointer 318 indicates to a user what location within the sample vessel the display screen 304 is displaying. The pointer can be superimposed on the image of the view camera by software control or mechanical line to pin-point the center of the image. The pointer 318 can be digitally superimposed on the thumbnail region 306 based on the calibration of the digital microscope instrument. The pointer 318 can be represented by a cross, a dot, an arrow, or any other useful shape. The pointer 318 can also be presented in a color that will be distinguishable from the image presented by the thumbnail region 306.

In addition to the picture-in-picture mode as shown in FIGS. 3A-3E, the thumbnail region can also be displayed in a full-screen preview mode. In such a manner, the larger sample area can be viewed (whether in picture-in-picture mode or preview mode) for a number of purposes. The larger viewing area is helpful for orienting users as to what location is being viewed by the magnification lens of the digital microscope as displayed on the display screen. Viewing this larger area helps users move the sample to a desirable location before performing detailed inspection using the magnified view of the microscope lens.

Figure 4:
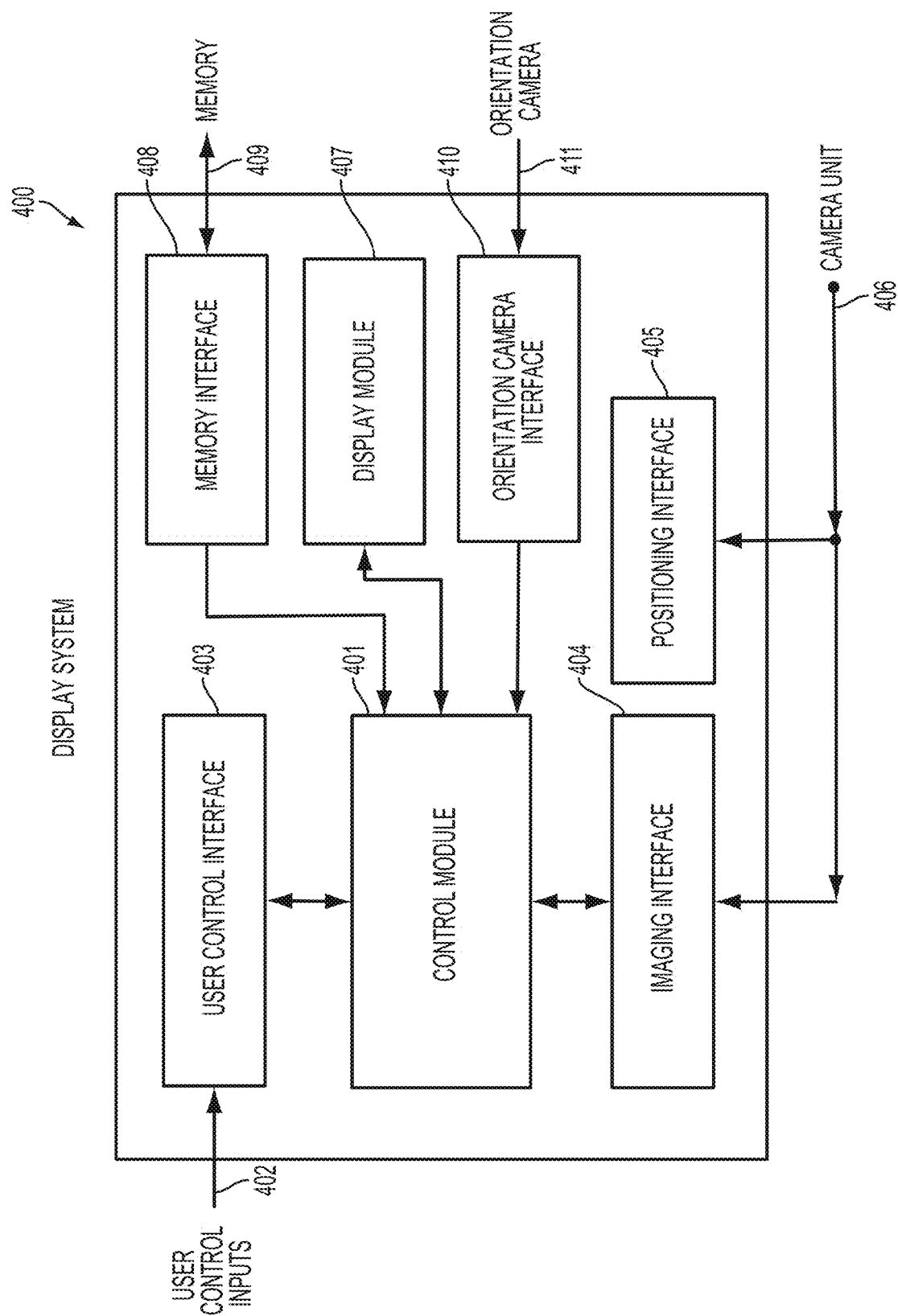
FIG. 4 shows a block diagram of an example display unit for a digital microscope according to one embodiment.

FIG. 4 shows a block diagram of an example display unit for a digital microscope according to one embodiment. The display unit 400 includes a display screen (not shown) and various programmable modules coupled therewith to facilitate operation of the display screen. In the illustrated embodiment, display unit 400 includes a display module 407 for communicating data and control information to the display screen to display images of a sample under inspection on the sample stage of the digital microscope. Display unit 400 includes a control module 401 configured to perform control operations based on user control inputs 402 via user control interface 403. The user control interface 403 is configured to receive user control inputs including, in at least certain embodiments, commands for performing focusing functions on displayed images of the samples as well as commands to capture images using the imaging system 406 of the microscope.

The display unit 400 further includes an imaging interface 404 coupled with the control module 401 that is operable to receive imaging information from a camera unit 406 of the digital microscope (such as imaging camera 120 and lens 122 of FIG. 1). Display unit 400 further includes a positioning interface 405 coupled with the control module 401 that is operable to receive positioning information from the camera unit 406 of the digital microscope including information relating to the position of lens 122 with respect to the sample under inspection. The control module 401 can be further configured to display images of the samples on the display screen based on the positioning information received from the positioning interface 405 and the control information received from the control interface 403.

The control module 401 is further configured to cause images of the samples displayed on the display screen to be captured and stored in memory based on further user inputs received at the user control interface 403. The captured images can be stored in a memory 409 using memory interface 408. The commands for performing focusing functions on images of the sample under inspection in the display screen include commands to perform panning and zooming functions as well as commands to adjust the granularity of the panning and zooming functions. In one embodiment, the display screen is a touch screen LCD display and the panning and zooming functions can be generated by user selection of control functions located on the touch screen of the display unit. In other embodiments, the panning and zooming functions can be generated from user-selectable mechanical controls, or a combination of mechanical and electrical user controls for selection of control functions displayed on the touch screen.

In other embodiments, control module 401 is configured to receive additional imaging information from an orientation camera 411 via orientation camera interface 410. The orientation camera 411 is disposed above the sample under inspection on the sample stage of the digital microscope. A wide-angle view of the images of the sample under inspection can then be displayed on the display screen of the digital microscope. The imaging information from the orientation camera provides a larger, wide-angle viewing area with respect to the samples under inspection than the camera unit 406 of the digital microscope. The first imaging information from the camera unit includes a magnified view of the sample under inspection on the sample stage of the digital microscope and the second imaging information includes an overhead perspective view of the sample under inspection. In one embodiment, the wide-angle viewing area can be displayed separately in a display window in preview mode before viewing the magnified image of the samples under inspection. In other embodiments, the wide-angle viewing area can be displayed in a picture-in-picture mode in a display window superimposed onto magnified images of the samples under inspection. In yet other embodiments, the wide-angle viewing area can be displayed as thumbnail images of the sample under inspection. Images displayed on the display screen, including those displayed in the in the wide-angle viewing area, can be updated in real time as the imaging information of the samples under inspection changes. In one embodiment, a user-selected sample vessel type can be used for holding the samples under inspection and a position indicator in the wide-angle viewing area is adjusted in accordance with the user-selected sample vessel type. The location of the lens of the camera unit 406 of the digital microscope can be tracked with respect to the sample under inspection and the tracking information can be displayed on the display screen. Post processing functions can also be performed on the images captured by the digital microscope.

Figure 5:
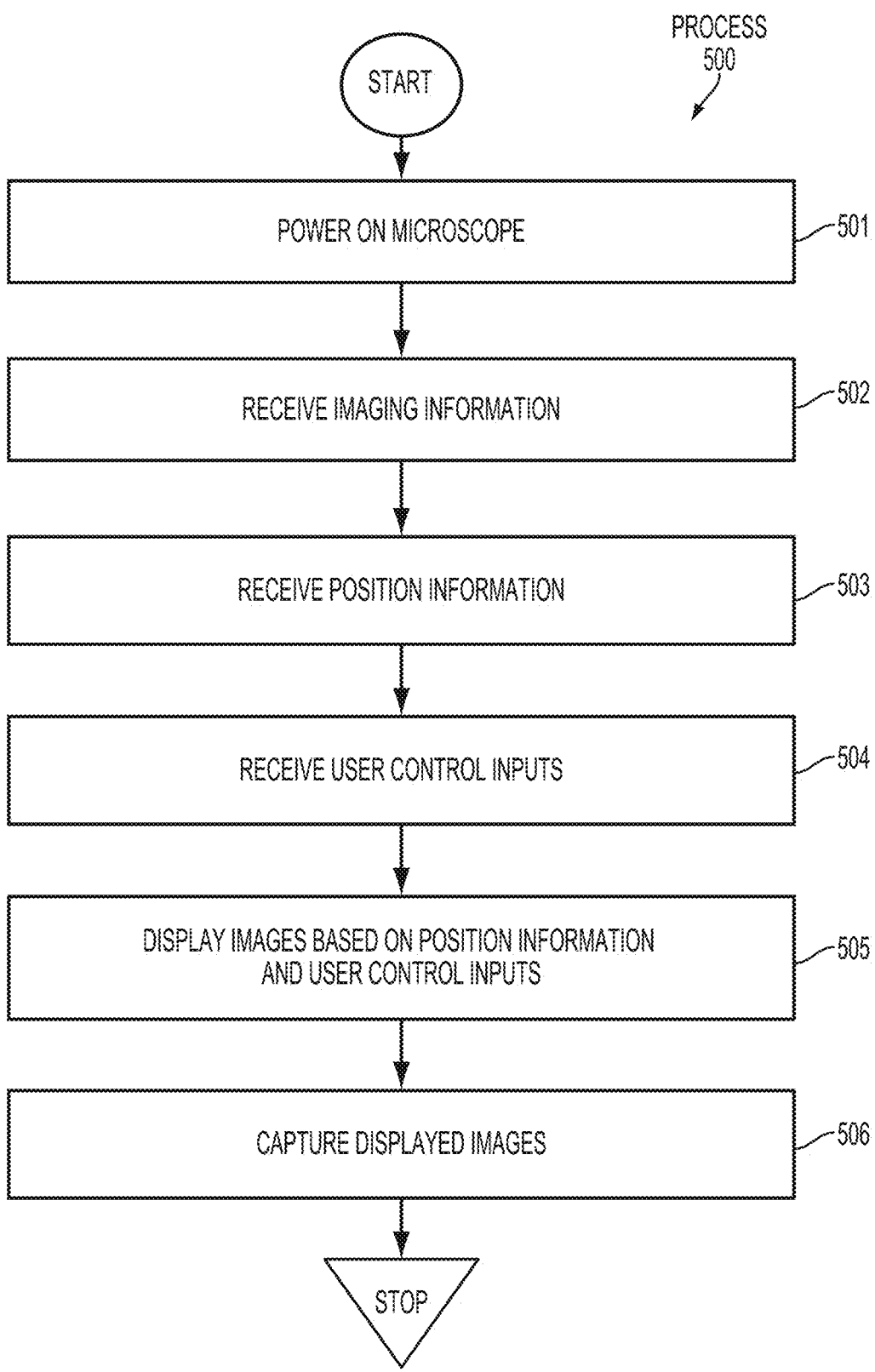
FIG. 5 shows an example flow chart of a process for using a digital microscope having an adjustable display according to one embodiment.

FIG. 5 depicts an example flow chart of a process for using a digital microscope with an adjustable display according to one embodiment. In the illustrated embodiment, process 500 begins at operation 501 where the digital microscope is powered on and in the ready state. Process 500 continues at operation 502 where imaging information is received at a controller for the display screen such as control module 401 of FIG. 4. In at least certain embodiments, the imaging information includes imaging information from the camera unit 406 of the digital microscope as well as imaging information from the orientation camera 411 disposed above the sample under inspection on the sample stage of the digital microscope. Process 500 continues where positioning information is received at the controller (operation 503). In one embodiment, the positioning information includes the position of the lens of the camera unit 406 with respect to a sample under inspection on a sample stage of the digital microscope.

Then at operation 504, control information is received from a control interface operable to receive user control inputs. In certain embodiments, the control information includes commands for performing focusing functions with respect to images of the sample under inspection as displayed on the display screen of the digital microscope. The commands for performing focusing functions can include, for instance, panning and zooming functions as well as commands to adjust the granularity of the panning and zooming functions. In one embodiment, the display is a touch screen display and the panning and zooming commands are generated by user selection of the user control inputs located on the touch screen. The panning and zooming functions can be generated from mechanical controls of the digital microscope or digital controls such as controls displayed on the touch screen. Alternatively, the panning and zooming functions can be generated from a combination of mechanical controls and digital controls such as those controls displayed as on the touch screen. Images of the sample under inspection can then be displayed on the display screen of the digital microscope based on the positioning information and the control information.

In at least certain embodiment, the imaging information from the orientation camera 411 provides a wide-angle viewing area with respect to the samples under inspection than the camera unit of the digital microscope. The imaging information from the camera unit 406 includes the magnified view of the sample under inspection on the sample stage of the digital microscope and the imaging information from the orientation camera 411 includes an overhead perspective view of the sample under inspection. In one embodiment, the wide-angle viewing area is displayed separately in a display window in preview mode before viewing the magnified image of the samples under inspection. In other embodiments, the wide-angle viewing area is displayed as a thumbnail image of the samples under inspection or in a picture-in-picture mode in a display window superimposed onto magnified images of the samples under inspection. The wide-angle viewing area can also be updated in real time as the first imaging information of the samples under inspection changes.

Images of the sample under inspection can then be displayed based on the positioning information and the control information (operation 505) and the images displayed can be captured based on further user input received at the control interface (operation 506). In one embodiment, the user control inputs are displayed on the touch screen. The captured images can then be stored for later retrieval or post processing in a memory coupled with the microscope. In one embodiment, the memory can be internal to the microscope and contained within the control module or other modules or components. In other embodiments, the memory can be an external memory, computer-readable storage medium, or other memory device such as a USB memory stick coupled with the microscope. This completes process 500 according to one example embodiment.

The user commands for performing focusing functions on the image of the sample under inspection in the display can include commands to perform panning and zooming functions as well as commands to adjust the granularity of the panning and zooming functions. In one embodiment, the display screen is a touch screen display and the panning and zooming functions are generated by user selection of control functions located on a touch screen of the display. In other embodiments, the panning and zooming functions can be generated from mechanical controls or a combination of mechanical controls with the user selection of the control functions located on the touch screen of the display.

Additional imaging information can be received from the orientation camera of the digital microscope that is adapted to provide a larger viewing area than the imaging device of the digital microscope. The larger viewing area provided by the orientation camera can be displayed in a picture-in-picture mode in a display window superimposed onto the magnified image of the sample under inspection or it can be displayed separately in a preview mode before viewing the magnified image of the sample under inspection. In addition, the larger viewing area provided by the orientation camera can be updated in real time as the first imaging information of the sample under inspection changes. Furthermore, a user can also select a sample vessel type to be used for the sample under inspection. In response to this, the system can be configured to automatically adjust the position of the larger viewing area in real time based on user inputs. After images have been captured and stored using the digital microscope, image processing functions can be performed on the images captured by the digital microscope.

Figure 6:
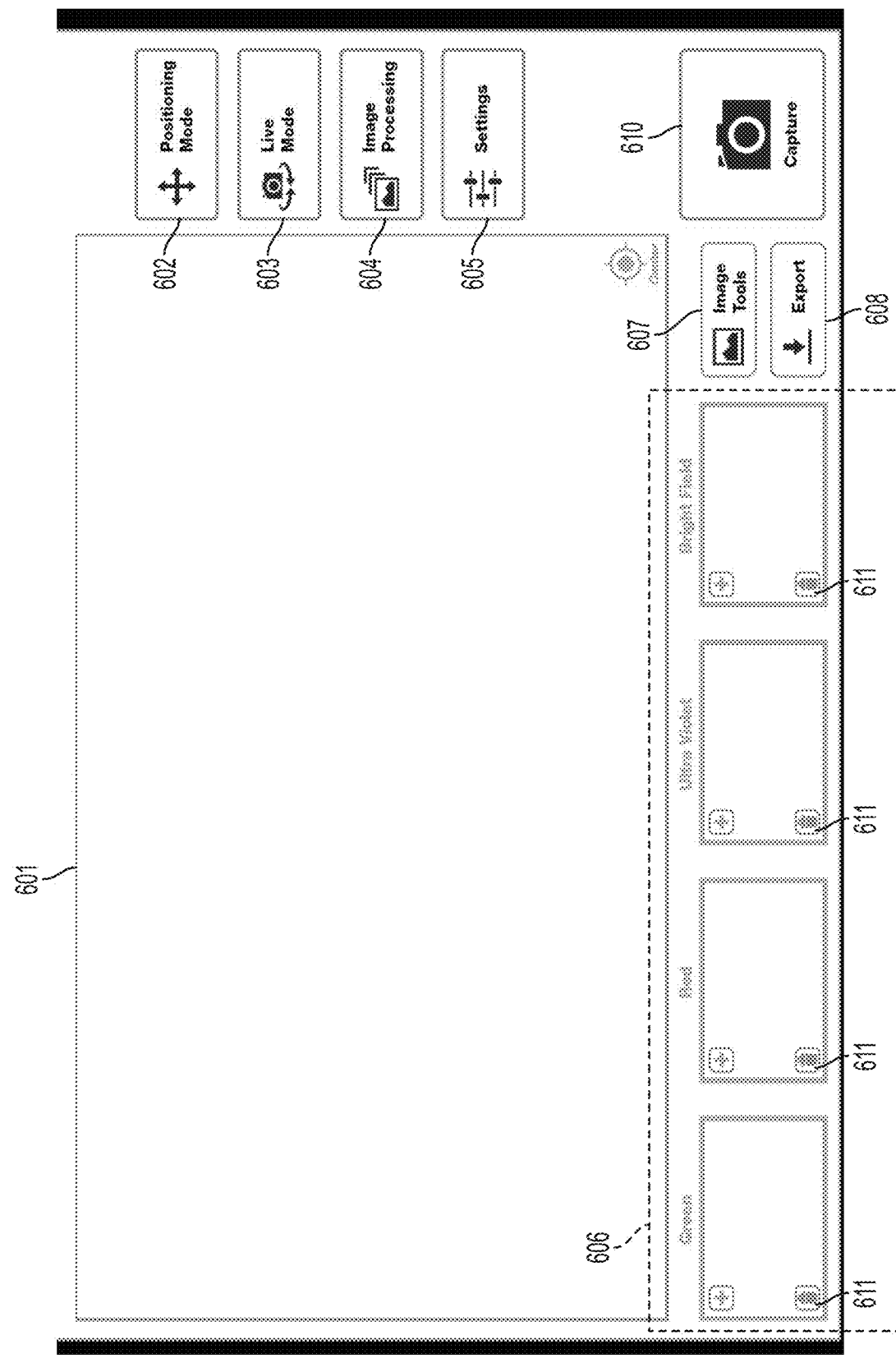
FIG. 6 shows an example screen shot of the graphical user interface in the display screen according to one embodiment.

The digital microscope described herein is operable in several modes including (1) a positioning mode, (2) a live image capture mode, (3) an image processing mode, and (4) a settings mode. FIG. 6 shows an example screen shot of the graphical user interface in the display screen according to one embodiment. In the illustrated embodiment, graphical user interface 601 includes a positioning mode selection tab 602. In positioning mode, a user can position the magnification lens of the microscope (e.g., lens apparatus 122 of imaging camera 120) based on user input of the zooming and panning controls described above. For instance, referring to display screen 304 of FIG. 3E, users can manipulate controls 308, 310, and 312 to provide inputs to position the magnification lens of the digital microscope. During positioning mode, the orientation camera can be used to provide a larger view of the sample and/or sample vessel with an indicator (such as crosshairs) above the field of view. Users can select the particular controls to adjust the magnified image accordingly and can use the larger view provided by the orientation camera to assist in zooming and/or panning to the appropriate location within the magnified view of the sample. An icon is also provided to center the image at position (0, 0).

Graphical user interface 601 further includes a live mode selection tab 603. Once a sample and/or sample vessel is positioned in the correct location to begin capturing images of the sample, users can enter live image capture mode by selecting tab 603. In one embodiment, the user display is a touch screen and the user-selectable controls can appear within the screen itself. In other embodiments, various mechanical user controls can be provided or a combination of touch screen and mechanical user controls. In one embodiment, when a user enters live mode, the bright field channel is activated (by default). In addition, the icons 606 for the four channels are activated and can be selected by users. Users can press an icon to center (position 0, 0) the motorized stage. Users can go back into the positioning mode by pressing the appropriate button 602. Users can also the image processing mode by pressing the appropriate icon 604. In one embodiment, the image processing mode includes merging of multiple images upon user input.

Users select the appropriate channel 606 and the corresponding channel indicator turns on. The image of the sample is now being viewed in the specific wavelength of light corresponding to the selected channel 606. Users can do pre-acquisition adjustments. Upon user swipe across the touch screen, this translates into a change in the position. In one embodiment, this change in position results in movement of the motorized stage and the position coordinates are updated to reflect the modified position. Users can then capture the sample view currently displayed in Live mode by pressing the capture icon 610. Images that are captured, in one embodiment, can be automatically saved to memory and users can easily delete it as desired by pressing on the delete buttons 611 in each respective channel accordingly. The captured image stays on until the user presses the "return to live mode" command. While the image is open, user can also export the image to an external memory such as a USB stick memory using the export tab 608.

Users can finish viewing a captured image by selecting another channel. In such a case, the live view screen comes up and the corresponding light source for the newly selected channel turns on and is displayed in 606 of the graphical user interface. As soon as an image is captured, it fills the appropriate channel. If a user clicks on a channel that already contains an image, then the captured image opens up. Each channel can contain one image.

Users can also perform various image processing tasks by selecting tab 604. The channel icons 606 for channels that contain a captured image are filled with a thumbnail of that image. Users click on a channel 606 and can perform post acquisition adjustments for selected channels. If multiple channels are selected then those adjustments will apply to all selected channels. All selected channels can be used in the image merge. Image merge and images from individual channels can be exported. A settings mode is also provided where users can enter settings such as date and time, or turning sounds on and off by selecting settings tab 605.

Provided below are descriptions of some devices (and components of those devices) that may be used in the systems and methods described above. These devices may be used, for instance, to receive, transmit, process, or store data related to any of the functionality described above. As will be appreciated by one of ordinary skill in the art, the devices described below may have only some of the components described below, or may have additional components.

Figure 7:
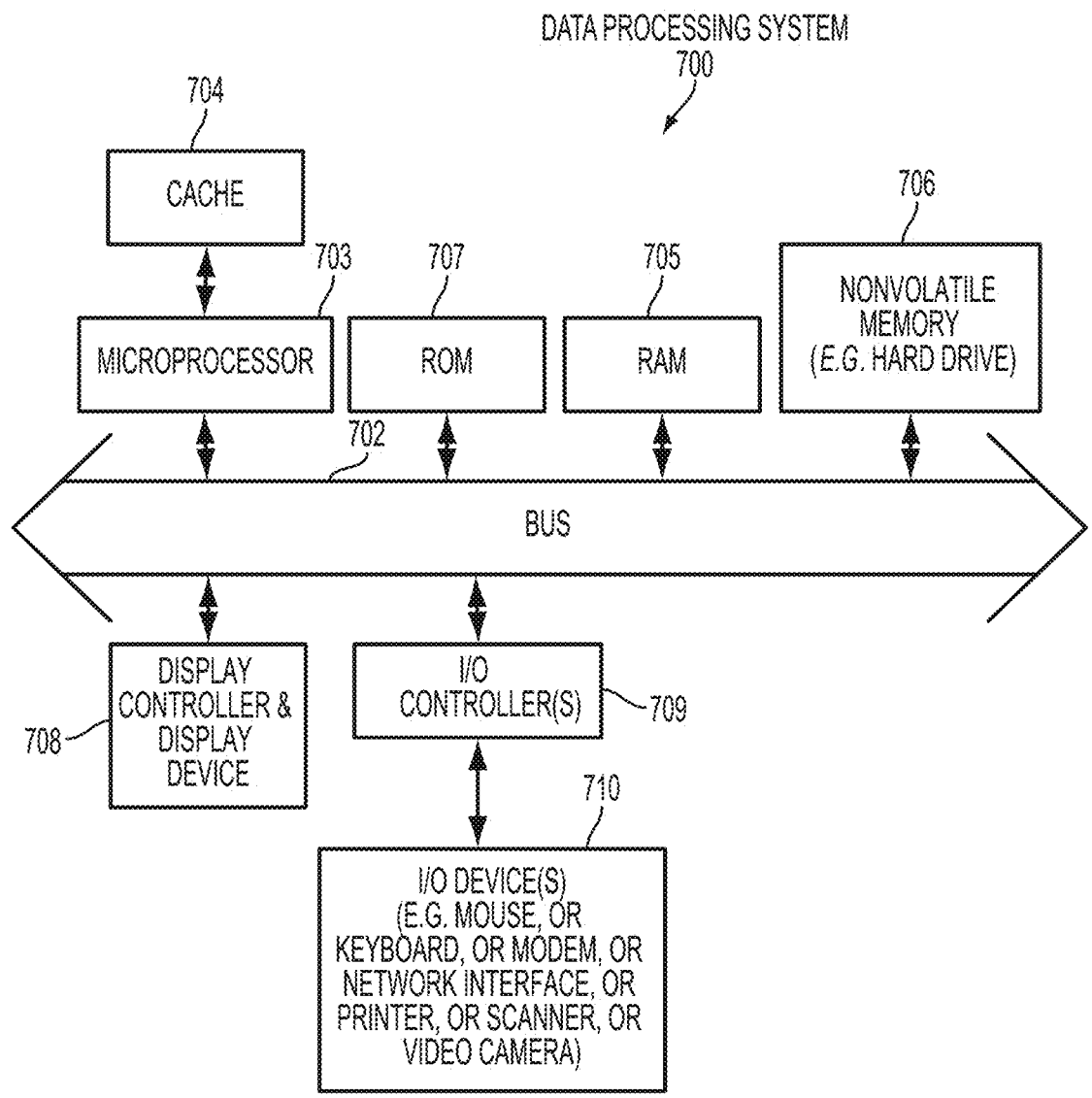
FIG. 7 shows an example block diagram of a data processing system upon which the disclosed embodiments may be implemented.

FIG. 7 depicts an example block diagram of a data processing system upon which the disclosed embodiments may be implemented. Embodiments may be practiced with various computer system configurations such as hand-held devices, microprocessor systems, microprocessor-based or programmable user electronics, minicomputers, mainframe computers, or similar systems. The embodiments can also be practiced in distributed computing environments where tasks are performed by remote processing devices that are linked through a wire-based or wireless network.

FIG. 7 shows one example of a data processing system, such as data processing system 700, which may be used with the described embodiments. Note that while FIG. 7 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 7 may, for example, be a personal computer (PC), workstation, tablet, smartphone or other hand-held wireless device, or any device having similar functionality.

As shown, the data processing system 701 includes a system bus 702 which is coupled to a microprocessor 703, a Read-Only Memory (ROM) 707, a volatile Random Access Memory (RAM) 705, as well as other nonvolatile memory 706. In the illustrated embodiment, microprocessor 703 is coupled to cache memory 704. System bus 702 can be adapted to interconnect these various components together and also interconnect components 703, 707, 705, and 706 to a display controller and display device 708, and to peripheral devices such as input/output ("I/O") devices 710. Types of I/O devices can include keyboards, modems, network interfaces, printers, scanners, video cameras, or other devices well known in the art. Typically, I/O devices 710 are coupled to the system bus 702 through I/O controllers 709. In one embodiment the I/O controller 709 includes a Universal Serial Bus ("USB") adapter for controlling USB peripherals or other type of bus adapter.

RAM 705 can be implemented as dynamic RAM ("DRAM") which requires power continually in order to refresh or maintain the data in the memory. The other nonvolatile memory 706 can be a magnetic hard drive, magnetic optical drive, optical drive, DVD RAM, or other type of memory system that maintains data after power is removed from the system. While FIG. 7 shows that nonvolatile memory 706 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

Aspects of the invention further include a method of controlling a display for a digital microscope. The method comprising receiving first imaging information from an camera unit of the digital microscope; receiving positioning information including a position of a lens of the camera unit with respect to a sample under inspection on a sample stage of the digital microscope; receiving control information from a control interface operable to receive user control inputs, wherein the control information includes commands for performing focusing functions with respect to images of the sample under inspection as displayed on the display screen of the digital microscope; receiving second imaging information from an orientation camera disposed above the sample under inspection on the sample stage of the digital microscope; and displaying images of the sample under inspection on a display of the digital microscope based on the positioning information and the control information.

The method above further comprising displaying thumbnail images of the sample under inspection based on the second imaging information received from the orientation camera. The method further comprising capturing images displayed on the display based on further user input received at the control interface. The method further comprising storing the captured image in a memory location within the digital microscope. The method further comprising tracking the location of the lens of the camera unit with respect to the sample under inspection and displaying the tracking information on the display screen. Wherein the commands for performing focusing functions include panning and zooming function commands as well as commands to adjust the granularity of the panning and zooming functions. Wherein the display is a touch screen display and the panning and zooming commands are generated by user selection of control functions corresponding to certain of the user control inputs which are located on the touch screen display. Wherein the panning and zooming functions are generated from mechanical controls of the digital microscope in combination with user selection of the control inputs located on the touch screen display. Wherein the images are captured based on user selection of additional control inputs located on the touch screen display. Wherein the first imaging information from the camera unit includes a magnified view of the sample under inspection on the sample stage of the digital microscope and the second imaging information includes an overhead perspective view of the sample under inspection. Wherein images displayed on the display screen are updated in real time based on the first and second imaging information.

The method above further comprising performing image processing functions on the images captured by the digital microscope. The method further comprising receiving user selection of a light source to generate a selected wavelength of light during image capture by the digital microscope based on additional control inputs located on the touch screen display; and generating the selected wavelength of light using the selected light source at the same time an image of the sample under inspection is captured by the digital microscope. Wherein the selected light source is one of multiple light-emitting diode ("LED") light sources that can be selected based on user control inputs.

Aspects of the invention further include a display system for a digital microscope comprising a controller having a processor and a memory coupled therewith via an interconnect bus, the memory adapted to store modules and instructions for operating the display system of the digital microscope; an imaging interface coupled with the controller and configured to receive first imaging information from an camera unit of the digital microscope; a positioning interface coupled with the controller and configured to receive positioning information including a position of a lens of the camera unit with respect to a sample under inspection on a sample stage of the digital microscope; a user control interface coupled with the controller and configured to receive control information based on user control inputs, wherein the control information includes commands for performing focusing functions with respect to images of the sample under inspection as displayed on the display screen of the digital microscope; an orientation camera interface coupled with the controller and configured to receive second imaging information from an orientation camera disposed above the sample under inspection on the sample stage of the digital microscope; a display screen; and a display module configured to display images of the sample under inspection on the display screen of the digital microscope based on the positioning information and the control information.

The display system above wherein the display module is further configured to display thumbnail images of the sample under inspection based on the second imaging information received from the orientation camera. Wherein images of the sample under inspection are captured based on user input received at the user control interface. Wherein the memory is further adapted to store the captured image in a memory location within the digital microscope. The display system further comprising a tracking module configured to track the location of the lens of the camera unit with respect to the sample under inspection and to send commands to the display module to display tracking information on the display screen. Wherein the commands for performing focusing functions include panning and zooming function commands as well as commands to adjust the granularity of the panning and zooming functions. Wherein the display screen is a touch screen and the panning and zooming commands are generated by user selection of control functions corresponding to certain of the user control inputs which are located on the touch screen. Wherein the panning and zooming functions are generated from mechanical controls of the digital microscope in combination with user selection of the control inputs located on the touch screen. Wherein images are captured based on user selection of additional control inputs located on the touch screen display. Wherein the first imaging information from the camera unit includes a magnified view of the sample under inspection on the sample stage of the digital microscope and the second imaging information includes an overhead perspective view of the sample under inspection. Wherein images displayed on the display screen are updated in real time based on the first and second imaging information. Wherein image processing functions are performed on the images captured by the digital microscope.

The display system above further comprising a plurality of light sources adapted to generate a selected wavelength of light during image capture of the sample under test by the digital microscope based on additional user control inputs located on the touch screen for receiving user selection of a light source of the plurality of light sources. Wherein the selected light source is one of multiple light-emitting diode ("LED") light sources that can be selected based on user control inputs.

Aspects of the invention further include a digital microscope comprising a magnification lens; a camera unit coupled with the magnification lens and adapted to provide first imaging information with respect to samples under inspection; a sample observation stage adapted to receive samples thereon for inspection by the digital microscope; an orientation camera disposed above the sample observation stage and adapted to provide second imaging information with respect to the samples under inspection; and a display screen configured to display images of the samples under inspection based on the first imaging information and the second imaging information. Wherein the first imaging information from the camera unit includes a magnified view of the samples under inspection on the sample stage of the digital microscope and the second imaging information includes an overhead perspective view of the samples under inspection. Wherein the second imaging information from the orientation camera provides a larger viewing area with respect to the samples under inspection than the camera unit of the digital microscope. Wherein the larger viewing area is a wide angle viewing area. Wherein the larger viewing area is displayed separately in a display window in a preview mode before viewing the magnified image of the samples under inspection. Wherein the larger viewing area is displayed as thumbnail images of the samples under inspection. Wherein the larger viewing area is displayed in a picture-in-picture mode in a display window superimposed onto magnified images of the samples under inspection. Wherein the larger viewing area is updated in real time as the first imaging information of the samples under inspection changes.

The digital microscope above further comprising a user selected sample vessel type used for holding the samples under inspection, wherein a position indicator in the larger viewing area is adjusted in accordance with the selected sample vessel type.

Aspects of the invention further including a method of using a digital microscope comprising receiving first imaging information with respect to samples under inspection from a camera unit coupled with a magnification lens of the digital microscope; receiving second imaging information from an orientation camera disposed above a sample observation stage that holds the samples for inspection by the digital microscope; and a display screen configured to display images of the samples under inspection based on the first imaging information and the second imaging information. Wherein the first imaging information from the camera unit includes a magnified view of the samples under inspection on the sample stage and the second imaging information includes an overhead perspective view of the samples under inspection. Wherein the second imaging information from the orientation camera provides a larger viewing area with respect to the samples under inspection than the camera unit of the digital microscope. Wherein the larger viewing area is a wide angle viewing area.

The method above further comprising displaying the larger viewing area separately in a preview mode before viewing magnified images of the samples under inspection. Wherein the larger viewing area is displayed as thumbnail images of the samples under inspection. Wherein the larger viewing area is displayed in a picture-in-picture mode in a display window superimposed onto magnified images of the samples under inspection. Wherein the larger viewing area is updated in real time as the first imaging information and second imaging information of the samples under inspection changes. The method further comprising receiving user selection of a sample vessel type used for holding the samples under inspection; and automatically adjusting the position of an indicator in the larger viewing area in accordance with the selected sample vessel type.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments may also be in the form of computer code stored on a computer-readable medium. Computer-readable media can also be adapted to store computer instructions, which when executed by a computer or other data processing system, such as data processing system 700, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

The above description is illustrative and is not restrictive, and as it will become apparent to those skilled in the art upon review of the disclosure, that the present invention may be embodied in other specific forms without departing from the essential characteristics thereof. For example, any of the aspects described above may be combined into one or several different configurations, each having a subset of aspects. Further, throughout the foregoing description, for the purposes of explanation, numerous specific details were set forth in order to provide a thorough understanding of the invention. It will be apparent, however, to persons skilled in the art that these embodiments may be practiced without some of these specific details. These other embodiments are intended to be included within the spirit and scope of the present invention. Accordingly, the scope of the invention should, therefore, be determined not with reference to the above description, but instead should be determined with reference to the following and pending claims along with their full scope of legal equivalents.

What is claimed is:

1. A digital microscope comprising:
   a magnification lens;
   a sample observation stage adapted to receive samples thereon for inspection by the digital microscope;
   an imaging camera unit coupled with the magnification lens disposed below the sample observation stage and adapted to provide a first digital image of a sample under inspection, wherein the imaging camera has a first viewing area, and the first digital image from the imaging camera unit includes a magnified view of at least a portion of the sample under inspection on the sample stage of the digital microscope within the first viewing area;
   an orientation camera disposed above the sample observation stage and adapted to provide second digital image of the sample under inspection, wherein the orientation camera has a second viewing area, and the second digital image from the orientation camera provides a view of at least a portion of the sample under inspection within the second viewing area, and wherein the second viewing area is larger than the first viewing area and completely encompasses the first viewing area; and
   a display screen configured to display images of the sample under inspection based on the first digital image and the second digital image.

2. The digital microscope of claim 1 wherein the second digital image includes an overhead perspective view of the sample under inspection.

3. The digital microscope of claim 1 wherein the second viewing area is a wide angle viewing area.

4. The digital microscope of claim 1 wherein the second viewing area is displayed separately in a display window in a preview mode before viewing the magnified image of the sample under inspection.

5. The digital microscope of claim 1 wherein the display screen is further configured to display thumbnail images of the sample under inspection based on the second digital image received from the orientation camera.

6. The digital microscope of claim 1 further comprising a tracking module configured to track the location of the magnification lens of the imaging camera unit with respect to the sample under inspection and to display tracking information on the display screen.

7. The digital microscope of claim 1 further comprising a motor configured to raise and lower the position of the magnification lens below the sample observation stage.

8. The digital microscope of claim 7 wherein the magnification lens is a prime lens.

9. A method of using a digital microscope comprising:
   receiving a first digital image from an imaging camera unit coupled with a magnification lens of the digital microscope disposed below a sample observation stage that holds a sample for inspection by the digital microscope, wherein the imaging camera has a first viewing area, and the first digital image from the imaging camera unit includes a magnified view of at least a portion of the sample under inspection on the sample stage of the digital microscope within the first viewing area;
   receiving a second digital image from an orientation camera disposed above the sample observation stage, wherein the orientation camera has a second viewing area, and the second digital image from the orientation camera provides a view of at least a portion of the sample under inspection within the second viewing area, and wherein the second viewing area is larger than the first viewing area and completely encompasses the first viewing area; and
   displaying images of the sample under inspection on a display screen based on the first digital image and the second digital image.

10. The method of claim 9 wherein the second digital image includes an overhead perspective view of the sample under inspection.

11. The method of claim 9 wherein the second viewing area is a wide angle viewing area.

12. The method of claim 9 further comprising displaying the larger viewing area separately in a preview mode before viewing magnified images of the sample under inspection.

13. The method of claim 9 further comprising displaying thumbnail images of the sample under inspection based on the second digital image received from the orientation camera.

14. The method of claim 9 further comprising tracking the location of the magnification lens of the imaging camera unit with respect to the sample under inspection and displaying the tracking information on the display screen.

15. The method of claim 9 further comprising raising and lowering the position of the magnification lens below the sample observation stage.

16. The method of claim 15 further comprising moving a fixed length focal plane through the sample under inspection disposed on the sample observation stage.

* * * * *